Dec. 12, 1933.　　　　J. L. FORD　　　　1,938,896
METER BOX YOKE
Filed June 8, 1931
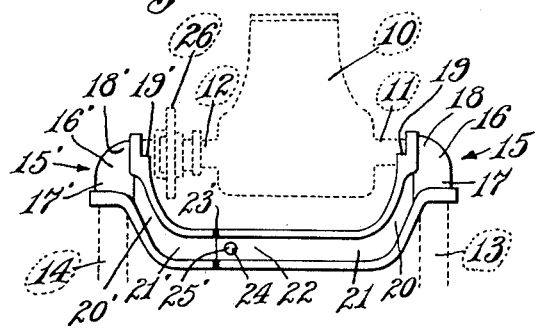
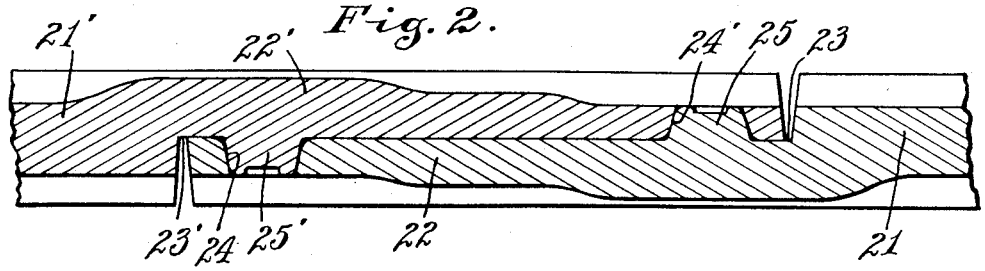
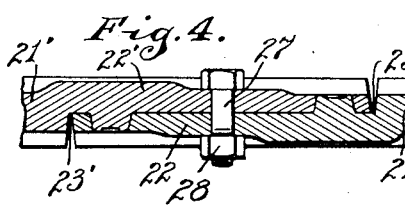
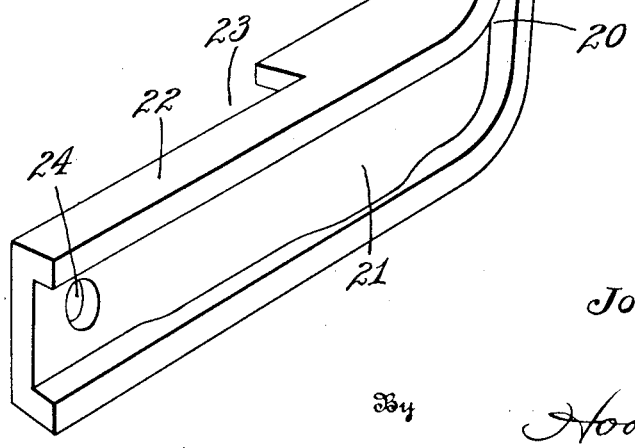
Inventor
John L. Ford,
By Hood + Hahn
Attorneys Patented Dec. 12, 1933

1,938,896

UNITED STATES PATENT OFFICE 1,938,896

METER BOX YOKE

John L. Ford, Wabash, Ind., assignor to Ford Meter Box Company, Wabash, Ind., a corporation of Indiana Application June 8, 1931. Serial No. 542,969

5 Claims. (Cl. 285—3)

The present invention relates to a yoke, the primary purpose of which is to provide a rigid mounting for a meter, or the like. A further object of the invention is to provide means easily attachable to a pair of spaced pipe ends, said means being constructed to facilitate the operative connection of a meter to said pipe ends, and further being constructed to prevent relative movement of said pipe ends. A further object of the invention is to provide a device of the character described which shall be extremely inexpensive to manufacture, very simple in construction, and which shall yet materially facilitate the attachment of the structure to such pipe ends. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a front elevation of a yoke constructed in accordance with the present invention, said yoke being shown in assembled position and associated elements being shown in dotted outline;

Fig. 2 is a fragmental horizontal section through a portion of such yoke;

Fig. 3 is a perspective view of an element of the yoke; and

Fig. 4 is a view similar to Fig. 2, but on a smaller scale, showing a modification.

Referring more particularly to the drawing, it will be seen that I have illustrated, in dotted outline, a meter 10 having aligned nipples 11 and 12, and a pair of parallel spaced pipe ends 13 and 14 to which said meter nipples are respectively to be connected. The meter nipples are shown connected to the pipes 13 and 14 through the medium of yoke elements indicated generally at 15 and 15′, respectively.

The elements 15 and 15′ are identical, and consequently only one of such elements will be described in detail. Each yoke element consists of a tubular portion 16 which, in the illustrated embodiment, is shown as an elbow. One end 17 of the tubular portion 16 is internally threaded for engagement upon the threaded end of the pipe 13, while the other end 18 of the tubular portion 16 is unthreaded but is provided with a seat or cradle 19 for the reception of one of the meter nipples.

A downwardly inclined arm 20 joins to said tubular portion a projection 21 which is radial with respect to the axis of the threaded end 17 of the tubular portion 16. The region 22 adjacent the extremity of the projection 21 is reduced in thickness, and preferably such reduction is effected either by the removal of the material of the projection 21 from one side thereof substantially to the center line thereof to form the socket 23, or by casting the element in a mold constructed to form the socket 23. At any rate, the socket 23 is of such dimensions that one side of the reduced portion 22 lies flush with the corresponding side of the main body of the projection 21, while the opposite side of said portion lies substantially upon the center line of the main body of the projection 21.

Adjacent its extremity, the reduced portion 22 is formed with a transverse aperture 24, and at a point spaced from said aperture, there is provided a stud 25 projecting laterally from the face of the portion 22 into the socket 23.

The element 15′ is, as has been said, an exact duplicate of the element 15, and primed reference numerals have been applied to the element 15′ in correspondence with the reference numerals applied to the element 15 and mentioned herein above.

It has long been customary to mount meters between the spaced ends of substantially parallel pipes by applying a yoke to the pipe ends, such yoke comprising a pair of elbows adapted to be secured to the pipe ends, and a connector bar separate from, but attachable to, said elbows. After the connector bar has been attached to the elbows, the meter, to one nipple of which has been applied an expander, such as that illustrated at 26, is set into the cradles of the elbows, and the expander is operated to secure the meter in place. Obviously, the installation of such a yoke comprises the steps of threading the respective elbows onto the pipe ends, then attaching one end of the connector to one of the elbows, and then attaching the other end of the connector to the other elbow. All of the steps involved in such an installation except the step of threading the elbows onto the pipe are eliminated by the present invention. As will be obvious, the present yoke may be installed by merely threading the elements 15 and 15′ onto the pipes 13 and 14, respectively. The element 15 may, for instance, be threaded onto the pipe 13 and turned down tightly on said pipe. It may then be backed away one fourth of a revolution, or until the projection 21 is substantially perpendicular to the plane of Fig. 1. Thereafter, the element 15' may be turned down onto the pipe 14, and may be brought into the position illustrated. The final assembly of the yoke is then effected merely by rotating the element 15 through 90 degrees until the projections 21 and 21' of the elements 15 and 15' come into alignment. When such arrangement is effected, the reduced portion 22 fits into the socket 23', while the reduced portion 22' enters the socket 23; the stud 25 enters the aperture 24', and the stud 25' enters the aperture 24. The stresses which are placed upon the yoke are all in the direction of the axes of the ends 18 and 18' of the tubular portions 16 and 16', and those stresses are readily resisted by the engagement of the studs 25 and 25' in the apertures 24' and 24.

It will also be obvious that the yoke of the present invention may be applied to the pipes 13 and 14 without the application of any dislocating stress to either of said pipes. Certain yokes which are on the market can be applied to the pipe ends only by forcing one pipe end or the other out of its normal position, and then forcing the pipe back into its normal position when the installation of the yoke is to be completed.

While I have illustrated the present invention as applied to a yoke intended for connection to parallel pipe ends, it will be understood that the invention includes also a form of yoke applicable to aligned pipe ends.

In case it is desired to provide a more secure connection for the projections 21, said projections may be formed, within the regions 22, with registering apertures for the reception of a bolt 27 and a clamp nut 28, as shown in Fig. 4.

I claim as my invention:

1. A meter box yoke comprising an element having a tubular portion threaded at one end for engagement with a pipe end and provided at its opposite end with a seat for the reception of a meter connection, a projection on said element, substantially parallel with the axis of said last-mentioned end of said tubular portion, the region adjacent the extremity of said projection being reduced in thickness, a laterally projecting stud formed on said reduced portion, an aperture formed in said reduced portion and spaced longitudinally from said stud; and a second element having a tubular portion threaded at one end for engagement with a pipe end and provided at its opposite end with a seat for the reception of a meter connection, a projection on said second element substantially parallel with the axis of said last-mentioned end of said tubular portion, the region adjacent the extremity of said projection being reduced in thickness, a laterally projecting stud formed on said reduced portion, an aperture formed in said reduced portion and spaced longitudinally from said stud; said reduced portions of said projections being associable to cause the stud on each of said projections to enter the aperture of the other of said projections.

2. A meter box yoke comprising an element having a tubular portion threaded at one end for engagement with a pipe end and provided at its opposite end with a seat for the reception of a meter connection, a projection on said element, substantially parallel with the axis of said last-mentioned end of said tubular portion, the region adjacent the extremity of said projection being reduced in thickness, a laterally projecting stud formed on said reduced portion; and a second element having a tubular portion threaded at one end for engagement with a pipe end and provided at its opposite end with a seat for the reception of a meter connection, a projection on said second element substantially parallel with the axis of said last-mentioned end of said tubular portion, the region adjacent the extremity of said projection being reduced in thickness, an aperture formed in said reduced portion; said reduced portions of said projections being associable to cause said stud to enter said aperture.

3. The combination with a pair of substantially parallel pipes, of means for maintaining a predetermined spacing between free ends of said pipes, comprising an element secured to the end of one of said pipes, and rotatable about the axis of said pipe, a projection on said element extending radially from the axis of said pipe, a second element secured to the end of the other of said pipes and rotatable about the axis thereof, a projection on said second element extending radially from the axis of said second-named pipe, and means carried by said projections, and interengageable by rotation of said projections into opposed alignment, to prevent relative movement of said elements in the direction of longitudinal extension of said projections.

4. As a new article of manufacture, a yoke element comprising a tubular portion threaded for engagement on a pipe end, a meter-connection seat associated with said tubular portion adjacent one end thereof, and a projection extending from said tubular portion in spaced parallelism with the axis of said last-mentioned end, said projection having, adjacent its extremity, a portion reduced in thickness from one side substantially to the center line of said projection, and being formed with an aperture through said reduced portion, and a laterally extending stud on said reduced portion and spaced from said aperture.

5. As a new article of manufacture, a yoke element comprising a tubular portion threaded for engagement on a pipe end, an open-sided meter-connection seat associated with said tubular portion adjacent one end thereof and adapted to receive a meter-connection by movement of said connection in a direction transverse to the axis of said connection into said seat, and a projection extending from said tubular portion in spaced parallelism with the axis of said last-mentioned end, said projection having, adjacent its extremity, a portion reduced in thickness from one side substantially to the center line of said projection, and being formed with an aperture through said reduced portion, and a laterally extending stud on said reduced portion and spaced from said aperture.

JOHN L. FORD.